United States Patent
Riva et al.

(10) Patent No.: US 10,108,817 B2
(45) Date of Patent: Oct. 23, 2018

(54) PRIVACY-PRESERVING COOKIES FOR PERSONALIZATION WITHOUT USER TRACKING

(71) Applicant: MICROSOFT TECHNOLOGY LICENSING, LLC, Redmond, WA (US)

(72) Inventors: Oriana Riva, Redmond, WA (US); Suman Nath, Redmond, WA (US); Douglas Christopher Burger, Bellevue, WA (US); Nitesh Mor, Berkeley, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 281 days.

(21) Appl. No.: 14/497,950

(22) Filed: Sep. 26, 2014

(65) Prior Publication Data
US 2016/0092699 A1    Mar. 31, 2016

(51) Int. Cl.
*G06F 21/00* (2013.01)
*G06F 21/62* (2013.01)
(Continued)

(52) U.S. Cl.
CPC ...... *G06F 21/6263* (2013.01); *H04L 63/0421* (2013.01); *H04L 67/02* (2013.01); *H04L 67/22* (2013.01); *H04L 67/306* (2013.01)

(58) Field of Classification Search
CPC ..... H04L 63/0421; H04L 67/02; H04L 67/22; H04L 67/306; G06F 21/6263
See application file for complete search history.

(56) References Cited

U.S. PATENT DOCUMENTS 8,346,749 B2   1/2013   Krause et al.
8,478,768 B1   7/2013   Pathak et al.
(Continued)

OTHER PUBLICATIONS

Computer Security—ESORICS 2014 "19th European Symposium on Research in Computer Wroclaw, Poland, Sep. 7-11, 2014 Proceedings, Part II".*

(Continued)

*Primary Examiner* — Ghodrat Jamshidi
(74) *Attorney, Agent, or Firm* — Alleman Hall Creasman & Tuttle LLP

(57) ABSTRACT

The privacy-preserving cookie generator implementations described herein create a privacy-preserving data structure (also called a privacy-preserving cookie herein) that is used to provide personalization for online services without user tracking. In some implementations the privacy-preserving cookie generator encodes a user profile (for example, based on a user's online activity) into a data structure that has naturally occurring noise and that efficiently supports noise addition. In one implementation a Bloom filter is used to create the encoded profile. Additional noise is injected into the encoded profile to create an obfuscated user profile in the form of a privacy-preserving data structure. The privacy-preserving data structure or cookie can be attached to an online service request and sent over a network to an online service provider which can use it fulfill the services request, providing a somewhat personalized result while the user's privacy is maintained.

20 Claims, 5 Drawing Sheets

(51) Int. Cl.
H04L 29/08 (2006.01)
H04L 29/06 (2006.01)

(56) References Cited

U.S. PATENT DOCUMENTS

| | | | |
|---|---|---|---|
| 8,504,411 B1* | 8/2013 | Subasic | G06Q 30/0201 |
| | | | 705/14.41 |
| 8,561,133 B1 | 10/2013 | Reeves | |
| 8,756,703 B2 | 6/2014 | Kovacs et al. | |
| 2006/0044115 A1* | 3/2006 | Doi | G06K 7/0008 |
| | | | 340/10.42 |
| 2009/0254971 A1* | 10/2009 | Herz | G06Q 10/10 |
| | | | 726/1 |
| 2012/0316956 A1 | 12/2012 | Nath et al. | |
| 2014/0013052 A1* | 1/2014 | Sawin | G06F 12/0862 |
| | | | 711/122 |
| 2014/0041047 A1 | 2/2014 | Jaye et al. | |
| 2014/0108435 A1 | 4/2014 | Kolesnikov | |
| 2014/0222704 A1* | 8/2014 | Abhyanker | G06Q 50/01 |
| | | | 705/319 |

OTHER PUBLICATIONS

Ensuring Security and Privacy in a Personalized Mobile Environment, Heechang Shin,Oct. 2010, pp. 1-256.*

"International Search Report & Written Opinion Issued in PCT Application No. PCT/US2015/052135", dated Nov. 11, 2015, 12 Pages.

Trabelsi, et al., "Privacy-Aware Policy Matching", In IEEE Symposium on Computers and Communications, Jun. 22, 2010, pp. 302-307.

Aggarwal, et al., "An Analysis of Private Browsing Modes in Modern Browsers", In Proceedings of the 19th USENIX conference on Security, Aug. 11, 2010, 15 pages.

AOL Inc., Open Directory Project, http://www.dmoz.org/, Apr. 28, 2014, p. 1.

Bajo, "Golomb-coded sets: Smaller than Bloom Filters", http://giovanni.bajo.it/post/47119962313/golomb-coded-sets-smaller-than-bloom-filters, Sep. 4, 2011, pp. 1-7.

Balakrishnan, et al., "Where's that phone?: geolocating IP addresses on 3G networks", In Proceedings of the 9th ACM SIGCOMM conference on Internet measurement conference, Nov. 4, 2009, 7 pages.

Balsa, et al., "OB-PWS: Obfuscation-Based Private Web Search", In Proceedings of the IEEE Symposium on Security and Privacy, May 20, 2012, 15 pages.

Bennett, et al., "Modeling the impact of short- and long-term behavior on search personalization", In Proceedings of the 35th international ACM SIGIR conference on Research and development in information retrieval, Aug. 12, 2012, 10 pages.

Bianchi, et al., "'Better Than Nothing' Privacy with Bloom Filters: To What Extent?", In Proceedings of the International Conference on Privacy in Statistical Databases, Sep. 26, 2012, 16 pages.

Bloom, Burton H, "Space/time trade-offs in hash coding with allowable errors", In Magazine Communications of the ACM, vol. 13, Issue 7, Jul. 1970, 5 pages.

Broder, et al., "Network Applications of Bloom Filters: A Survey", In Proceedings Internet Mathematics vol. 1, No. 4, Retrieved on: Jul. 31, 2014, 25 pages.

Casado, et al., "Peering Through the Shroud: The Effect of Edge Opacity on Ip-based Client Identification", In Proceedings of the 4th USENIX conference on Networked systems design & implementation, Apr. 11, 2007, 14 pages.

Chirita, et al., "Using ODP metadata to personalize search", In Proceedings of the 28th annual International ACM SIGIR conference on Research and Development in Information Retrieval, Aug. 15, 2005.

Clauß, et al., "Structuring Anonymity Metrics", In Proceedings of the Second ACM Workshop on Digital Identity Management, Nov. 3, 2006, 8 pages.

Meierhoefer, Cameron, "The Myth of Static IP", Published on: Sep. 8, 2008, Available at: http://www.comscore.com/lat/Insights/Blog/The-Myth-of-Static-IP.

Townsend, et al., "Quantifying Query Ambiguity", In Proceedings of the second international conference on Human Language Technology Research, Mar. 24, 2002, 6 pages.

Dingledine, et al., "Tor: the second-generation onion router", In Proceedings of the 13th conference on USENIX Security Symposium, vol. 13, Aug. 13, 2004, 17 pages.

Ferrer, et al., "h(k)—Private Information Retrieval from Privacy-Uncooperative Queryable Databases", In Online Information Review, vol. 33, Issue 4, Retrieved on: Jul. 31, 2014, 2 pages.

Dou, et al., "A Large-Scale Evaluation and Analysis of Personalized Search Strategies", In Proceedings of the 16th International Conference on World Wide, May 8, 2007, 10 pages.

Franz, et al., "Attacking Unlinkability: The Importance of Context", In Proceedings of the 7th international conference on Privacy enhancing technologies, Jun. 20, 2007, 18 pages.

Fredrikson, et al., "RePriv: Re-imagining Content Personalization and In-browser Privacy" In Proceedings of the 2011 IEEE Symposium on Security and Privacy, May 22, 2011, 16 pages.

Gauch, et al., "Ontology-based personalized search and browsing", In Journal Web Intelligence and Agent Systems, vol. 1, Issue 3-4, Dec. 2003, 17 pages.

Goldschlag, et al., "Onion Routing for Anonymous and Private Internet Connections", In Communications of the ACM, vol. 42, No. 2, Jan. 1999, 6 pages.

Guha, et al., "Privacy Analysis of the Privad* Privacy-preserving Advertising System", In Technical Report: MPI-SWS-2010-002, Jan. 2010, 15 pages.

Guha, et al., "Privad: Practical Privacy in Online Advertising", In Proceedings of the 8th USENIX Conference on Networked Systems Design and Implementation, Mar. 30, 2011, 14 pages.

Howe, et al., "TrackMeNot: Resisting Surveillance in Web Search", In Lessons from the Identity Trail: Anonymity, Privacy, and Identity in a Networked Society, Mar. 2009, 23 pages.

Jansen, et al., "Real Life, Real Users, and Real Needs: A Study and Analysis of User Queries on the Web", In Journal Information Processing and Management: an International Journal, Jan. 2000, 21 pages.

Jain, et al., "Using Bloom Filters to Refine Web Search Results", In Proceedings of the Eight International Workshop on the Web & Databases, Jun. 16, 2005, 9 pages.

Jensen, et al., "Location Privacy Techniques in Client-Server Architectures", In Book Privacy in Location-Based Applications, Jul. 30, 2009, 28 pages.

Juels, Ari, "Targeted Advertising . . . And Privacy Too", In Proceedings of the Conference on Topics in Cryptology: The Cryptographers Track at RSA, Apr. 8, 2001, 16 pages.

Karasawa, Kei., "Personalized Search using Identity-Based Hashing", In Proceedings of the 4th ACM workshop on Digital identity management, Oct. 31, 2008, pp. 71-79.

Krovetz, et al., "Lexical Ambiguity and Information Retrieval", In Journal ACM Transactions on Information Systems, vol. 10, Issue 2, Apr. 1992, 32 pages.

Ma, et al., "Interest-based personalized search", In Journal ACM Transactions on Information Systems, vol. 25, Issue 1, Feb. 2007, 38 pages.

Murugesan, et al., "Providing Privacy through Plausibly Deniable Search", In Doctoral Dissertation Privacy through Deniable Search, Apr. 30, 2009, 12 pages.

Nandi, et al., "P3: A Privacy Preserving Personalization Middleware for recommendation-based services", In 11th Privacy Enhancing Technologies Symposium, Jul. 27, 2011, 12 pages.

Nikiforakis, et al., "Cookieless monster: Exploring the ecosystem of web-based device fingerprinting", In Proceedings of the IEEE Symposium on Security and Privacy, May 19, 2013, 15 pages.

Olivier, Martin S., "Distributed Proxies for Browsing Privacy—A Simulation of Flocks", In Annual Conference of the South African Institute of Computer Scientists and Information Technologists, Sep. 2005, 9 pages.

(56) References Cited

OTHER PUBLICATIONS

Purcell, et al., "Search Engine Use 2012", Published on: Mar. 12, 2012, Available at: http://www.pewinternet.org/files/old-media/Files/Reports/2012/PIP_Search_Engine_Use_2012.pdf.
Rebollo-Monedero, et al., "Optimized query forgery for private information retrieval", In Journal IEEE Transactions on Information Theory, vol. 56, Issue 9, Sep. 2010, 12 pages.
Shapira, et al., "PRAW—A PRivAcy model for the Web", In Journal of the American Society for Information Science and Technology, vol. 56, Issue 2, Jan. 2005, 2 pages.
Shen, et al., "Implicit user modeling for personalized search", In Proceedings of the 14th ACM international conference on Information and knowledge management, Oct. 31, 2005, 8 pages.
Silverstein, et al., "Analysis of a very large web search engine query log", In Newsletter ACM SIGIR Forum, vol. 33, Issue 1, Sep. 1999, 7 pages.
Song, et al., "Identifying Ambiguous Queries in Web Search", In Proceedings of the 16th international conference on World Wide Web, May 8, 2007, 2 pages.
Sontag, et al., "Probabilistic models for personalizing web search", In Proceedings of the fifth ACM international conference on Web search and data mining, Feb. 8, 2012, 10 pages.
Speretta, et al., "Personalized Search Based on User Search Histories", In Proceedings of the IEEE/WIC/ACM International Conference on Web Intelligence, Sep. 19, 2005, 7 pages.
Sweeney, Latanya, "K-anonymity: A Model for Protecting Privacy", In International Journal on Uncertainty, Fuzziness and Knowledge-based Systems, vol. 10 Issue 5, Oct. 2002, 14 pages.
Teevan, et al., "Personalizing Search via Automated Analysis of Interests and Activities", Aug. 15, 2005, 8 pages.
Teevan, et al., "To personalize or not to personalize: modeling queries with variation in user intent", In Proceedings of SIGIR, Jul. 20, 2008, 8 pages.
Toth, et al., "Measuring Anonymity Revisited", In Proceeding of the 9th Nordic Workshop on Secure IT Systems, Nov. 4, 2004, 6 pages.
Toubiana, et al., "Adnostic: Privacy Preserving Targeted Advertising", In Proceedings of the Network and Distributed System Security Symposium, Feb. 28, 2010, 23 pages.
Xu, et al., "Privacy-enhancing Personalized Web Search", In Proceedings of the 16th international conference on World Wide Web, May 8, 2007, 10 pages.
Ye, et al., "Noise Injection for Search Privacy Protection", In Proceedings of the 2009 International Conference on Computational Science and Engineering—vol. 03, Aug. 29, 2009, 8 pages.
Mor, et al., "Bloom Cookies: Web Search Personalization without User Tracking", In Proceedings of the 22nd Annual Network and Distributed System Security Symposium, Feb. 8, 2015, 15 Pages.
"Second Written Opinion Issued in PCT Application No. PCT/US2015/052135", dated Mar. 24, 2016, 7 Pages.
"International Preliminary Report on Patentability Issued in PCT Application No. PCT/US2015/052135", dated Oct. 21, 2016, 8 Pages.

* cited by examiner

US 10,108,817 B2

PRIVACY-PRESERVING COOKIES FOR PERSONALIZATION WITHOUT USER TRACKING

BACKGROUND

Online services such as web search and advertising are becoming increasingly personalized. The more and the longer a service knows about an individual, the better personalization it can provide. Typically, these online services build user profiles (containing, for example, web sites frequently visited, user interests, demographics information, location and so forth) on a server by tracking multiple online activities from the same user and linking them together using various techniques, usually under poorly informed user consent.

The simplest way to link a user's online activities is to use the Internet Protocol (IP) address of his device. However, as a device's IP address can change over time, online services track users across their IP sessions using cookies, device fingerprinting, and browser plug-ins, to name a few. To limit such tracking, users can hide IP addresses by using techniques such as, for example, proxies and anonymity networks or onion routing. They can also disable web cookies, and browse in private mode to prevent tracking by cookies. However, these approaches deny personalization because services do not have access to the information necessary for building user profiles anymore.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the privacy-preserving cookie generator implementations described herein create a privacy-preserving data structure (also called a privacy-preserving cookie herein) that is used to provide personalization for online services without user tracking. In some implementations the privacy-preserving cookie generator encodes a user profile (for example, based on a user's online activity) into a data structure that has naturally occurring noise and that efficiently supports noise addition. Additional noise is injected into the encoded profile to create an obfuscated user profile in the form of a privacy-preserving data structure that allows personalized online services to be provided to a user while maintaining a specified level of user privacy.

In some implementations of the privacy-preserving cookie generator, a user profile is encoded by applying a Bloom filter to the user profile to build a personalization profile and injecting noise into the personalization profile to create a privacy-preserving cookie. A Bloom filter is a known space-efficient probabilistic data structure used to store a set of elements and support membership queries. When querying if an element exists in the Bloom filter, false positives are possible but false negatives are not.

Once the privacy-preserving data structure or cookie is created, it can then be attached to an online service request at a client and sent over a network to an online service provider (e.g., on a server or a computing cloud) and the service provider can use the privacy-preserving cookie to fulfill the service request, providing a somewhat personalized result while the user's privacy is maintained. For example, the privacy-preserving cookie can be attached to a search query sent over a network to allow a search engine to provide personalized search results in response to the query while maintaining user privacy. Similarly, the privacy-preserving cookie can be used to personalize other online services such as to provide suggestions for products and services based on a user's location or based on a user's interests. This can be done by matching results generated by the service provider to items in the privacy-preserving cookie which represents the user's obfuscated profile.

Thus, privacy-preserving cookies can replace traditional cookies (i.e., the user can disable third party cookies in his browser), with the possibility of the user controlling what profile information is included in the privacy-preserving cookie and when the cookie is sent to which online service.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
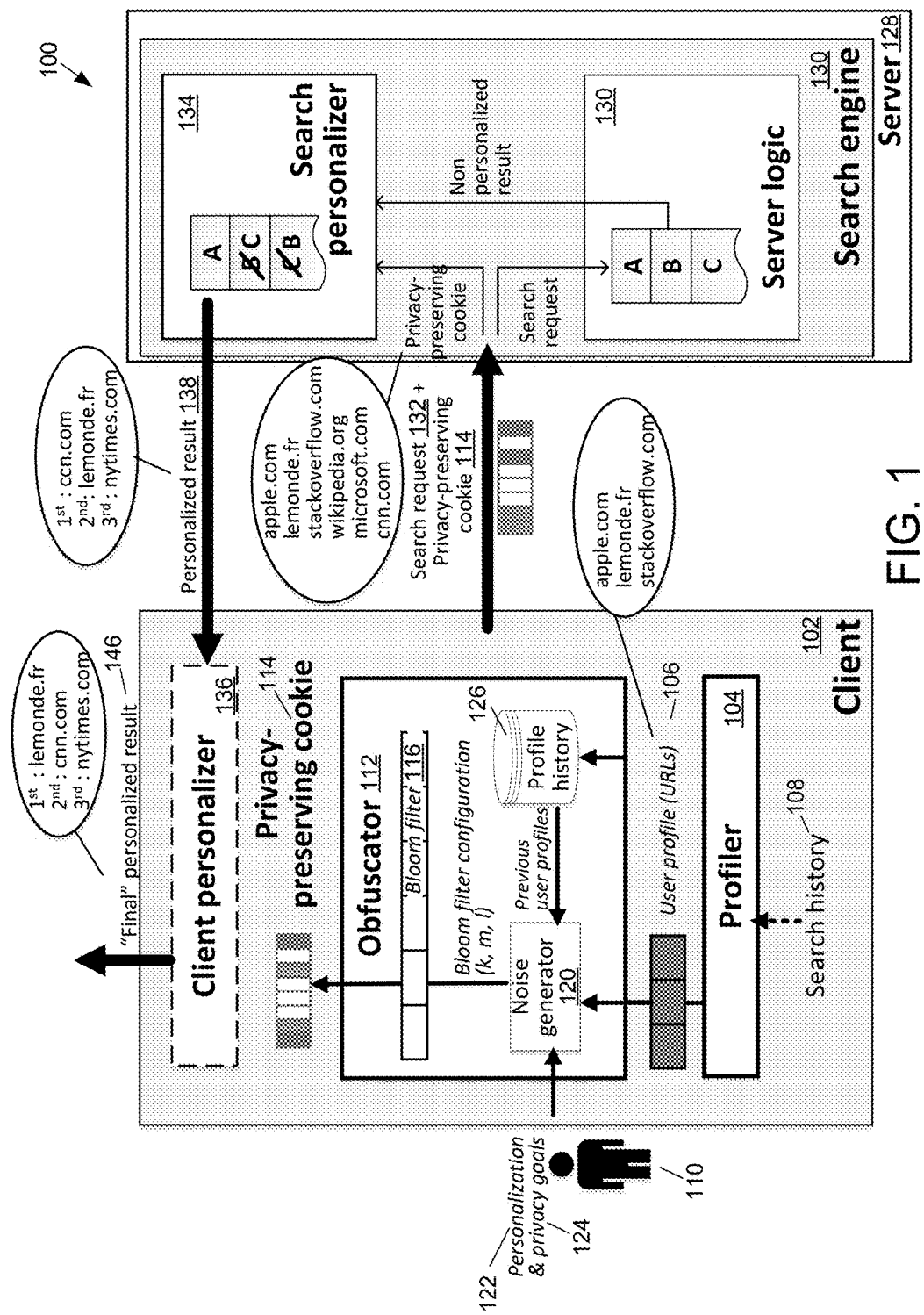
FIG. 1 depicts a system for practicing one exemplary implementation of the privacy-preserving cookie generator described herein.

In the following description of privacy-preserving cookie generator implementations, reference is made to the accompanying drawings, which form a part thereof, and which show by way of illustration examples by which the privacy-preserving cookie generator implementations described herein may be practiced. It is to be understood that other embodiments may be utilized and structural changes may be made without departing from the scope of the claimed subject matter.

1.0 Privacy-Preserving Cookie Generator

The following sections provide an introduction and overview of the privacy-preserving cookie generator implementations described herein, as well as exemplary processes and a system for practicing these implementations. Details of various embodiments and exemplary computations are also provided.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

1.1 Introduction

Although user privacy and personalization of online services are at odds, they are not mutually exclusive. For example, it is possible to maintain user profiles at a client and carry out personalization there, to the extent possible. In this way, little or nothing is disclosed to the server or computing cloud hosting the service. However, a pure client-side approach has drawbacks that make it infeasible in a real system. First, without any information about the user, the service provider on the server or computing cloud needs to send all or a large number of results to the client for local personalization. The communication overhead can be prohibitive for many platforms such as mobile devices. Second, it requires the service to put its proprietary personalization algorithms on the client, which is often unacceptable. To address these challenges, existing systems use two techniques. First, personalization is done by a server or by a personalization proxy and not on the client. The personalization proxy is, in general, not trusted by the client. Second, because the client does not trust the party providing personalization, it sends limited information about the user profile (e.g., high-level interests) with its request, so that the proxy (or server) can filter out results irrelevant to the user or can partially personalize the results. Hence, a key requirement of these systems is to properly obfuscate the user profiles before sending them out.

There are two known techniques for profile obfuscation: generalization that shares items in a user's profile only at a coarse granularity (e.g., category of frequently visited web sites, instead of actual URLs), and noise addition which adds fake items to the profile to hide the real items.

The privacy-personalization tradeoffs of such profile obfuscation techniques have been investigated in the context of web search. Search logs from a popular search engine have been used to quantify the tradeoffs. It has been found that noise addition provides a better privacy-personalization tradeoff than generalization, although many existing systems typically employ generalized profiles to protect users' privacy. Interestingly, even though generalized profiles provide anonymity, this does not naturally translate into unlinkability, a measure for determining privacy, over time. Unlinkability of two or more items of interest means that within a system comprising the items of interest and possibly other items, from a malicious server's perspective, these items of interest are no more and no less related after observation than they are related concerning a-priori knowledge. If a server is able to identify whether two requests are coming from the same or different clients (linkability), it can collect enough information to identify the user over time.

The superior performance of noisy profiles compared with generalization, however, comes at two costs. Depending on how much noise is added to the profile, a noisy profile can be very large and hence can impose a large communication overhead. It has been shown that to achieve reasonable privacy and personalization, it is necessary to add up to tens of kB of noise per request. Moreover, the noise needs to be generated by using a large noise dictionary usually provided by a trusted third party.

There are various design choices that affect personalization and privacy in online systems. Understanding these can help in better design of privacy-preserving personalization for many applications. By the way of example, the following discussion is limited to web search, for three main reasons. First, search engines are among the most visited web sites and users are concerned about how these services implement personalization. Second, most search queries are short and ambiguous, and personalization can help disambiguating the queries towards an individual user's interests. Third, logs from a popular search engine are readily available, making a practical analysis possible.

For purposes of the following discussion, a generic client-server model is assumed. Each client is associated with a profile that captures the user's general preferences and is represented as a bag of profile items such as interest categories or URLs of web sites he frequently visits. Profiles are usually constructed using users' search history, but they could also leverage demographic information, web browsing history or social network interactions, for even richer user models. In processing a query from the client, the server utilizes the user's profile to personalize search results for him.

Personalization in web search refers to ranking search results such that higher-ranked results are more likely to be clicked by the user than lower-ranked results. A server can use existing techniques, such as tailoring search queries to a user's interests or re-ranking search results based on web sites the user visits most frequently, in order to push likely-to-be-clicked results towards the top of the result list.

In general it can be assumed that a client does not trust the service provider hosted on server or computing cloud with his profile. Exposing the exact user profile to the server may leak a user's identity and hence for privacy, the client obfuscates his profile before sending it to the server. Unlinkability is considered as a key privacy measure. Unlinkability ensures that the server cannot identify if two queries are coming from the same client or different clients. Unlinkability of a client's profile can be achieved by obfuscating it with noise, i.e., by adding fake items in the profile, before sending it to the server.

1.2 Privacy-Personalization Design

Designing a privacy-preserving personalized online service, such as, for example, a search engine, involves many important design choices which are discussed in the paragraphs below.

An important design decision is how a client's profile is obfuscated so that the server can still find it useful for personalization, but cannot link profiles from the same user. As discussed above, existing solutions for privacy-preserving web search can be classified into two categories: profile generalization and noise addition.

Profile Generalization: In profile generalization profile items are generalized to a coarser granularity (e.g., a URL is generalized to its category, a GPS location is generalized to its corresponding ZIP code). The server cannot distinguish between users with the same generalized profile, even if their original profiles are different. The idea has been used in other applications as well, such as cloaking a user's location with a cloaked region to achieve location privacy.

Noise Addition: In noise addition, fake profile items, called dummies, are added to, and some original profile items are taken away from, the user's profile. With a large number of fake items independently added to the profile each time it is sent to the server, two noisy profiles from the same client look different, making it difficult for the server to link them.

Existing systems use these different techniques for evaluating either personalization or privacy. For example, one privacy-focused system, uses generalized profiles and assumes that they can be safely shared with servers to ensure some form of anonymity. Personalization-focused systems, on the other hand, show that URLs without any generalization yield a better personalization.

It has been found that noise addition provides a better privacy-personalization tradeoff than generalization. It has also been shown that anonymity provided by generalized profiles does not naturally translate into unlinkability over time. In general, a noisy profile can provide a similar level of unlinkability as a generalized profile, but with better personalization (or similar personalization with better unlinkability). This is counter-intuitive since noise, by definition, negatively affects personalization. However, the negative effect is offset by finer granularity of profile items (than generalized profile items), resulting in a net positive improvement in personalization.

Even though a noisy profile has its advantages over a generalized profile, they do not come for free. There are two key disadvantages. First, if many fake items must be added to the profile to ensure reasonable unlinkability, the noisy profile can be very large. Since the noisy profile is sent to the server often, possibly with each request, the communication overhead can be too much for energy-constrained devices like smartphones. Second, the fake items need to be picked from an unbiased sample of the items in the profiles of all users in the system. If the sample from which a client chooses fake items is biased (e.g., all items are related to football) and if the bias is known to the server, it can easily filter the noise out to identify the real items. Thus, the client needs to find a trusted third party who would compute an unbiased sample for him. This is a strong dependence. The sample also needs to be updated as users join and leave the system, as new profile items appear or as items' popularity changes.

It has been shown that the size of the noisy profile that needs to accompany each client request can be in the order of tens of kB, much larger than actual requests and responses. The overhead is significant even if the noisy profile is compressed. The high costs of noisy profiles can make them impractical. Moreover, the requirement of a noise dictionary constitutes an additional threat because a malicious server may supply biased dictionaries that make the noise more predictable.

1.3 Privacy-preserving Cookie Generator Overview

The following paragraphs provide an overview of the assumptions employed by some privacy-preserving cookie generator implementations, as well as various design choices possible. An exemplary system and exemplary processes for practicing the privacy-preserving cookie generator are also provided.

In privacy-preserving cookie generator implementations a privacy-preserving data structure is created by encoding a user profile into a data structure that has naturally occuring noise and that efficiently supports noise addition. (In some implementations the data structure used to create the privacy-preserving data structure is a Bloom filter, although other data structures that have naturally occuring noise and that efficiently support noise addition could also be used.) Additional noise is then injected into the encoded data structure to create the privacy-preserving data structure (e.g., privacy preserving cookie) that allows personalized online services to be provided to a user while maintaining a specified or desired level of privacy. The privacy-preserving data structure is sent over a network with a service request (e.g., to a server or to a computing cloud) which then uses the privacy-preserving data structure to select the service results to be provided to the user.

As discussed above, some implementations of the privacy-preserving cookie generator generate privacy-preserving cookies, noisy user profiles based on Bloom filters that are significantly smaller (comparable to the size of today's web cookies) and that do not require a noise dictionary for their generation. In some embodiments, a privacy-preserving cookie is generated and maintained by the client device and is sent to online services every time the user makes a service request. An online service can use the cookie to deliver personalized results.

Besides explicitly injecting noisy bits into the Bloom filter, implementations of the privacy-preserving cookie generator exploit the false positives naturally occurring in it as noise to provide privacy. The privacy-preserving cookie generator also provides a procedure that, given a user's privacy and personalization goals, can automatically configure a privacy-preserving cookie's parameters. It has been shown that privacy-preserving cookies provide a more convenient privacy, personalization, and network efficiency tradeoff.

1.3.1 Assumptions

The privacy-preserving cookie generorator aims for unlinkability across IP-sessions, where an IP-session is a sequence of all queries with the same source IP address. The privacy-preserving cookie generator does not assume that techniques for hiding a device's IP address (proxies and anonymity networks or onion routing) are available, because they require changes to the network infrastructure and thus are not always practical. These techniques, however, are orthogonal to privacy-preserving cookies and can further increase a user's privacy. In one scenario, a search engine sees the IP address the search queries are coming from. Thus, a goal of the privacy-preserving cookie generator is to thwart a malicious server's attempts to correlate queries from different IP-sessions to find if they are associated with the same user.

Unlinkability across IP-sessions is a useful privacy goal since IP-sessions are typically short (on the order of a few weeks) in practice. For instance, a smartphone's IP address changes relatively often, basically each time there is no network activity the radio is turned off. In a home network, IP addresses change less frequently, depending on the type of provider and network contract. In a corporate network, IP addresses may remain the same for longer, but network traffic from multiple devices is aggregated under the same IP address thus making user identification hard. (The IP address stays the same but source ports change with every new outgoing connection. This is similar to the Smartphone case where devices get a new IP address every time the radio wakes up.) In general, the shorter the IP-session, the harder for the server to link different sessions.

Privacy-preserving cookie generator implementations assume that users' web browsers are configured in a way that prevents online services from tracking them through cookies, browser fingerprinting, browser plug-ins, or similar techniques. The user's browser (or the underlying system) keeps track of the user's online activities (e.g., search queries, visited sites) and maintains a profile that reflects the user's interests, preferences, and habits. The profile is not directly shared with any online service; instead it is encoded as a privacy-preserving cookie and is sent with each search query to the server. As will be shown, privacy-preserving cookies are efficient and privacy-preserving, and yet allow a server, service provider or computing cloud to personalize results.

A server, service provider or computing cloud might launch correlation attacks based on the content of the search queries, or other meta-information associated with the queries (e.g., time of the search query, frequency, location or language). Some evaluations of the privacy-preserving cookie generator indirectly factor the effect of such correlations in the size of the user population. In a practical deployment, a search engine potentially has billions of users, but a malicious search engine which is trying to link the different IP-sessions belonging to a single user together, can use this extra information to group search sessions into smaller clusters. A simple example is to use IP geolocation to put all the IP-sessions from a small town into one cluster. The smaller the clusters, the easier it is to link users together.

Finally, it is assumed the server, cloud or service provider has access only to information collected through its own service (i.e., search requests submitted to the search engine). It is also assumed the server is not colluding with other sources, such as other services (e.g., email, social networks) or third party trackers.

1.3.2 Privacy Preserving Cookie Design

Privacy-preserving cookie generator implementations can achieve personalization while minimizing the risk of being successfully tracked by an online service creating privacy-privacy preserving cookies for encoding a user's profile in an efficient and privacy-preserving manner.

In general, as discussed previously, the privacy-preserving cookie generator implementations described herein create a privacy-preserving data structure that is used to provide personalization for online services without user tracking. In some implementations the privacy-preserving cookie generator encodes a user profile (e.g., based on a user's online activity, such as for example, search history of Uniform Resource Locators (URLs) of the websites the user visited most often) into a data structure that has naturally occurring noise and that efficiently supports noise addition. Noise is then injected into the encoded data structure to create the privacy-preserving data structure that allows personalized online services to be provided to a user while maintaining a specified level of user privacy.

In some implementations of the privacy-preserving cookie generator, a user profile is encoded by applying a Bloom filter to the user profile to build a personalization profile and then injecting noise into the personalization profile to create a privacy-preserving cookie. A Bloom filter is a well known space-efficient probabilistic data structure used to store a set of elements and support membership queries. More specifically, a Bloom filter is used to store elements from a set E, and is implemented as a bit-string of size m with k hash functions. When querying if an element exists in the Bloom filter, false positives are possible but false negatives are not. The probability p of false positives can be controlled by varying m and k (e.g., $k=m/n \cdot \ln 2$ minimizes p, where $n=|E|$).

Once the privacy-preserving cookie is created, it can then be attached to an online service request and sent to an online service and the service can use the privacy-preserving cookie to fulfill the services request, providing a somewhat personalized result while the user's privacy is maintained. For example, the privacy-preserving cookie can be attached to a search query sent over a network to allow a search engine to provide personalized search results in response to the query while maintaining user privacy.

Besides the privacy-preserving cookie generator, two other possible state-of-the-art of noise addition techniques are called RAND and HYBRID herein. Both of these techniques work by introducing fake profile items (i.e., URLs) into a real user profile. The noise level is controlled by the parameter f, which represents the number of fake profile items added for each real profile item. For example, if the original profile has k items, the noisy profile with f=10 will have 11·k items. These RAND and HYBRID noise addition techniques assume a dictionary D which contains URLs and top-3 Open Directory Project (ODP) categories associated to each URL. (The ODP classifies a portion of the web according to a hierarchical taxomony with several thousand topics, with specificity increasing towards leaf notes of a corresponding tree. Web pages are classified using the most general two levels of the taxonomy, which account for 220 topics.) RAND represents a noise addition technique, which simply draws fake URLs randomly from D. HYBRID is a more advanced technique, which draws fake URLs randomly from a user-specific dictionary, called uD, computed by eliminating from D all URLs that do not have any ODP category matching the user's interests (which are also expressed as ODP categories). The advantage of HYBRID over RAND is that if a malicious server is able to infer a user's interests (e.g., from search keywords), it cannot simply discard (fake) URLs that do not match the user's interests.

One straightforward way is to create a privacy-preserving cookie using the privacy-preserving cookie generator is to insert the URLs from a noisy profile generated by RAND or HYBRID into a Bloom filter, which a client then sends to a service provider on a server along with his service requests or queries. For personalization, the server simply queries the Bloom filter for all the URLs contained in the search results for the submitted search query and re-ranks the results accordingly. The number of search results to be re-ranked is commonly in the range 10-100, which makes the number of Bloom filter queries acceptable. As the Bloom filter size can be significantly smaller than the actual list of URLs, this can reduce the communication overhead. However, this approach still does not remove the need for a noise dictionary required by techniques like RAND and HYBRID.

To avoid the need for a noise dictionary and reduce even further the communication overhead, implementations of the privacy-preserving cookie generator introduces noise at the bit-level of a Bloom filter. More specifically, implementations of the privacy-preserving cookie generator start with the exact profile of the client, encode the URLs or other data present in the exact profile into a Bloom filter, and then set a random set of fake bits in the filter (i.e., to 1). This data structure, consisting of a Bloom filter of an exact profile and a set of fake bits, is called a privacy-preserving cookie. The presence of fake bits increases the false positive rate of the filter and acts as noise. The number of fake bits acts as a tuning knob to control the magnitude of noise.

The above use of Bloom filters to generate privacy-preserving cookies is relatively simple. There are at least five features that make Bloom filters advantageous for profile obfuscation.

1. Efficiency: In terms of size, Bloom filters are much more compact than a bag of URLs used by noise addition techniques such as RAND and HYBRID. This reduces the communication overhead of sending noisy profiles to the server.

2. Noisy by design: Bloom filters' false positives, typically considered as drawbacks, are an advantage for the privacy-preserving cookie generator. In fact, the false positives in a Bloom filter act as natural noise that can be controlled via various design parameters such as the number of hash functions.

3. Non-deterministic noise: The level of noise introduced by Bloom filters changes automatically as the content of the filter changes. This makes it harder for an adversary to predict the level of noise utilized. Noise determinism is a significant problem for standard noise addition techniques.

4. Dictionary-free: By adding noise by setting random fake bits, the privacy-preserving cookie generator can work without any noise dictionary. The requirement of a noise dictionary introduces additional overhead and privacy threats.

5. Expensive dictionary attacks: Unlike most profile obfuscation techniques that represent noisy profiles as a list of profile items, Bloom filters represent them as an array of bits. To build a complete user profile, a potential adversary would need to query the Bloom filter for all possible elements present in some reference dictionary.

As discussed above, in addition to false positives naturally occurring in Bloom filters, the privacy-preserving cookie generator injects noise by setting random bits in the filter. The level of noise is controlled by the parameter l (different from the noise level f used in RAND and HYBRID) which represents the fraction of bits set in a Bloom filter, either corresponding to the original profile items or to noise. Note that l is used to control only the number of fake bits that the privacy-preserving cookie generator needs to set after the privacy-preserving cookie generator inserts the original profile items. If the number of bits set by the original profile items is already greater than the target value of l, the privacy-preserving cookie generator does not add any noisy bits. The reason for configuring noise as a fraction of the total number of bits (rather than as a constant number of bits) is to keep the number of bits observed by the server constant. Consider the case of two profiles A and B each containing n=10 element. When stored in a Bloom filter (with k=1), let one assume A sets 7 unique bits and B sets 10 unique bits. It is intuitive to see that when trying to reverse engineer the content of the Bloom filter the second profile will be mapped to more profile items than the first one, thus indicating that B requires fewer noisy bits than A to achieve the same level of protection. This is why the fraction of bits set in the Bloom filter, regardless of whether they are real or fake bits, is itself an indication of the degree of obfuscation.

The number of hash functions, k, and the level of noise, l, are the main parameters to control obfuscation in privacy-preserving cookies created by the privacy-preserving cookie generator. When increasing k, the average unlinkability decreases and the personalization loss shrinks. In fact, increasing k means reducing the probability of false positives as well reducing the number of noisy bits controlled by l (because with larger k more bits are set for each profile item when stored in the Bloom filter). Conversely, increasing m (slightly) increases unlinkability (and has almost no effect on personalization). This is because although a larger m reduces the probability of false positives, a larger Bloom filter means that more noisy bits are set because l controls the fraction of bits set and it depends on m. The noise effect controlled by l prevails thus making unlinkability higher when m increases. The variations are relatively small. For this reason, some privacy-preserving cookie generator implementations use only k and l to control the noise level of privacy-preserving cookies.

1.4 An Exemplary System

FIG. 1 depicts one exemplary implementation 100 of the privacy-preserving cookie generator framework as applied to web search. At a client computer 102, a profiler 104 builds a personalization profile 106 based on the user's search history 108. In this implementation the profile 106, consisting of URLs of the web sites the user 110 visited most often, is fed into an obfuscator 112 which generates an obfuscated user profile in the form of a privacy-preserving cookie 114.

In this implementation a Bloom filter 116 is applied by the obfuscator 112 to the user profile 106 in order to generate the privacy-preserving cookie 114. The obfuscator 112 configures the level of obfuscation of the profile using the Bloom filter through two parameters: the number of hash functions (k) and the noise level (l). In principle, a Bloom filter's probability of false positives p depends on k and m (the larger k, the smaller p; the larger m, the smaller p), however, in practice m has little impact on the obfuscation achieved. Therefore, this implementation of the privacy-preserving cookie generator varies only k for obfuscation purposes (in one working implementation of the privacy-preserving cookie creator m is typically set to 1000-2000 bits). The parameters k and l are computed by a noise generator 120. This uses a simple prediction procedure (described later with respect to FIG. 4) that given a user's personalization goal 122 and privacy goal 124 together with a history of profiles 126 previously sent to the server 128 predicts the optimal <k,l> configuration.

The generated privacy-preserving cookie 114 is sent to the search engine 130 on a server 128 along with the user's search request 132. At the search engine 130, a personalizer 134 re-ranks the search results based on the noisy user profile stored in the privacy-preserving cookie. The personalizer queries the privacy-preserving cookie for each search result. If the search result appears to be stored in the cookie, it ranks it higher by some factor decided by the server. The final set of ranked search results is arranged and sent to the client. Optionally, a client-side personalizer 136 can further refine the results and their rank based on the noise-free user profile 106 which is known to the client 102 to obtain a final personalized result 140. Like the personalizer on the server side, the client can decide by how much re-rank the results originally ranked by the server. It can even decide to drop some results if showing fewer results can benefit the client.

1.5 Exemplary Processes

The following paragraphs discuss exemplary processes for practicing some implementations of the privacy-preserving cookie generator.

Figure 2:
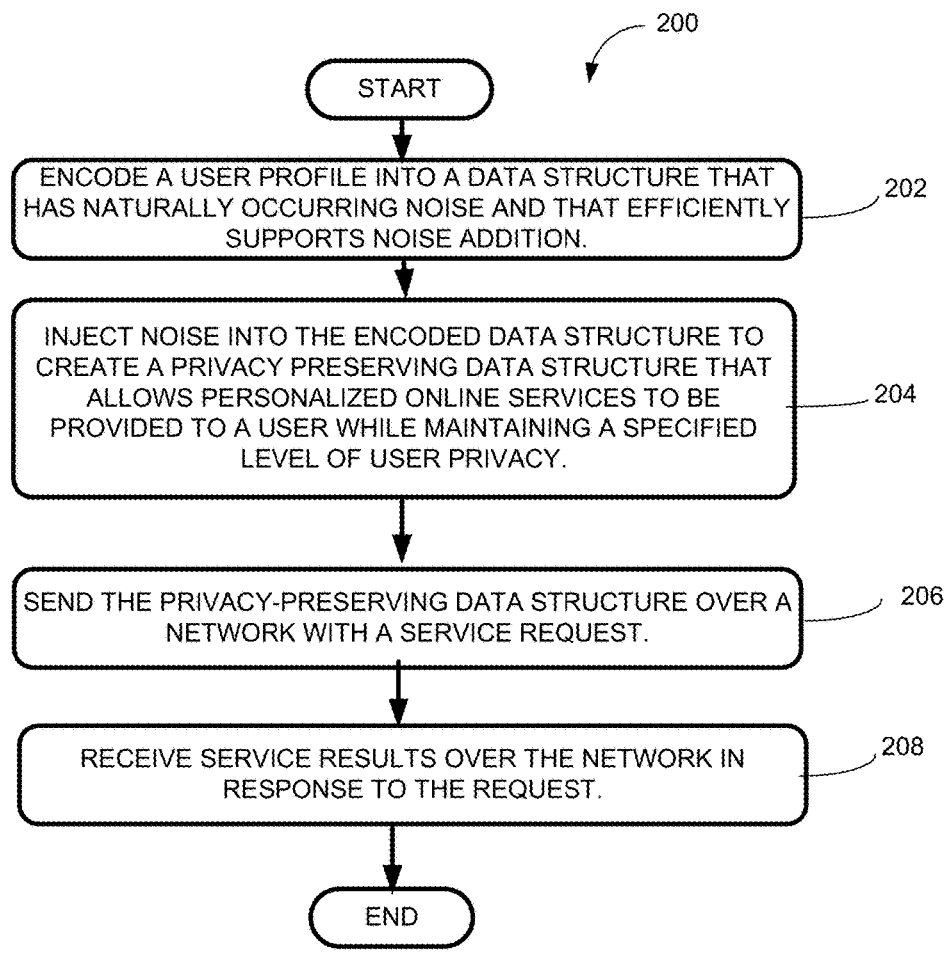
FIG. 2 depicts a flow diagram of an exemplary process for practicing one implementation of the privacy-preserving cookie generator described herein.

FIG. 2 depicts an exemplary process 200 for creating a privacy-preserving data structure in one implementation of the privacy-preserving cookie generator that allows for personalization of online services for a user without user tracking. In order to achieve this, the user's profile is encoded into a data structure that has naturally occurring noise and that efficiently supports noise addition, as shown in block 202. Noise is injected into the encoded data structure to create the privacy-preserving data structure that allows personalized online services to be provided to a user while maintaining a specified level of user privacy, as shown in block 204. The noise can be injected by setting a random number of bits in the encoded data structure.

Once the privacy-preserving data structure is created it can be sent over a network (e.g., to a service provider, server, computing cloud or search engine) with a service request, as shown in block 206. The service request could be a search query, a request for product information, a request for news, a request for information on restaurants near the user's location, and so forth. The personalized results of the request are received over the network in response to the request, as shown in block 208. For example, the results could be a personalized set of search results, a personalized list of products the user might be interested in, personalized news stories the user might be interested in, or a personalized list of restaurants based on the user's location. These personalized results are determined by the service provider based on the user's obfuscated profile in a manner similar to how the service provider would determine personalized results for the user based on an unobfuscated profile. However, due to the profile obfuscation the user's privacy is preserved.

Figure 3:
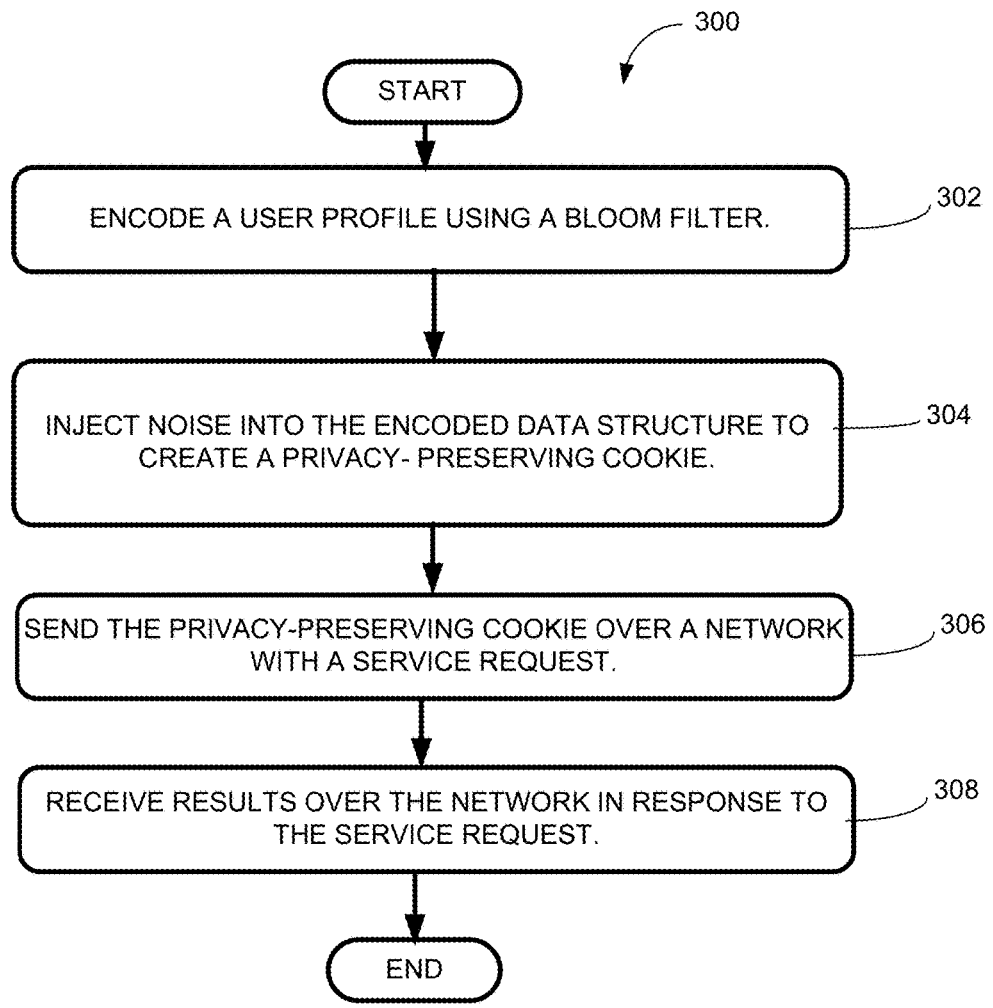
FIG. 3 depicts a flow diagram of another exemplary process for practicing another implementation of the privacy-preserving cookie generator described herein.

FIG. 3 depicts another exemplary process 300 for creating a privacy-preserving data structure, herein called a privacy-preserving cookie, using a Bloom filter. In this implementation a user profile is encoded using a Bloom filter, as shown in block 302. Noise is injected into the encoded data structure representing the encoded user profile to create the privacy-preserving cookie (that allows personalized online services to be provided to a user while maintaining a specified level of user privacy), as shown in block 304. The noise is injected by setting random bits in the encoded data structure. When an increased number of bits are set, the user's level of privacy increases. In fact, the level of noise can be controlled by the fraction of bits set in the Bloom filter. This privacy-preserving cookie represents the obfuscated user profile. It should be noted that the privacy-preserving cookie is quite small in size and is created without the use of a noise dictionary. This allows for the more efficient use of network bandwidth and computer resources.

The privacy-preserving data cookie is then sent over a network (e.g., to a service provider, server, computing cloud) with a service request, as shown in block 306. For example, like the implementation discussed with respect to FIG. 2, the service request could be a search query, a request for product information, a request for news, a request for information on restaurants near the user's location, and so forth. The personalized results of the request can then be received over the network, as shown in block 308. These personalized results are determined by the service provider based on the user's obfuscated profile in a manner similar to how the service provider would determine personalized results for the user based on an unobfuscated profile. However, due to the profile obfuscation the user's privacy is preserved. Furthermore, the level of obfuscation of the user profile can be tailored by the number of hash functions applied to the profile when encoding it by applying the Bloom filter and the amount of noise added. The level of obfuscation can also be automatically tailored based on a user's personalization and privacy goals, as is discussed below with respect to FIG. 4.

Figure 4:
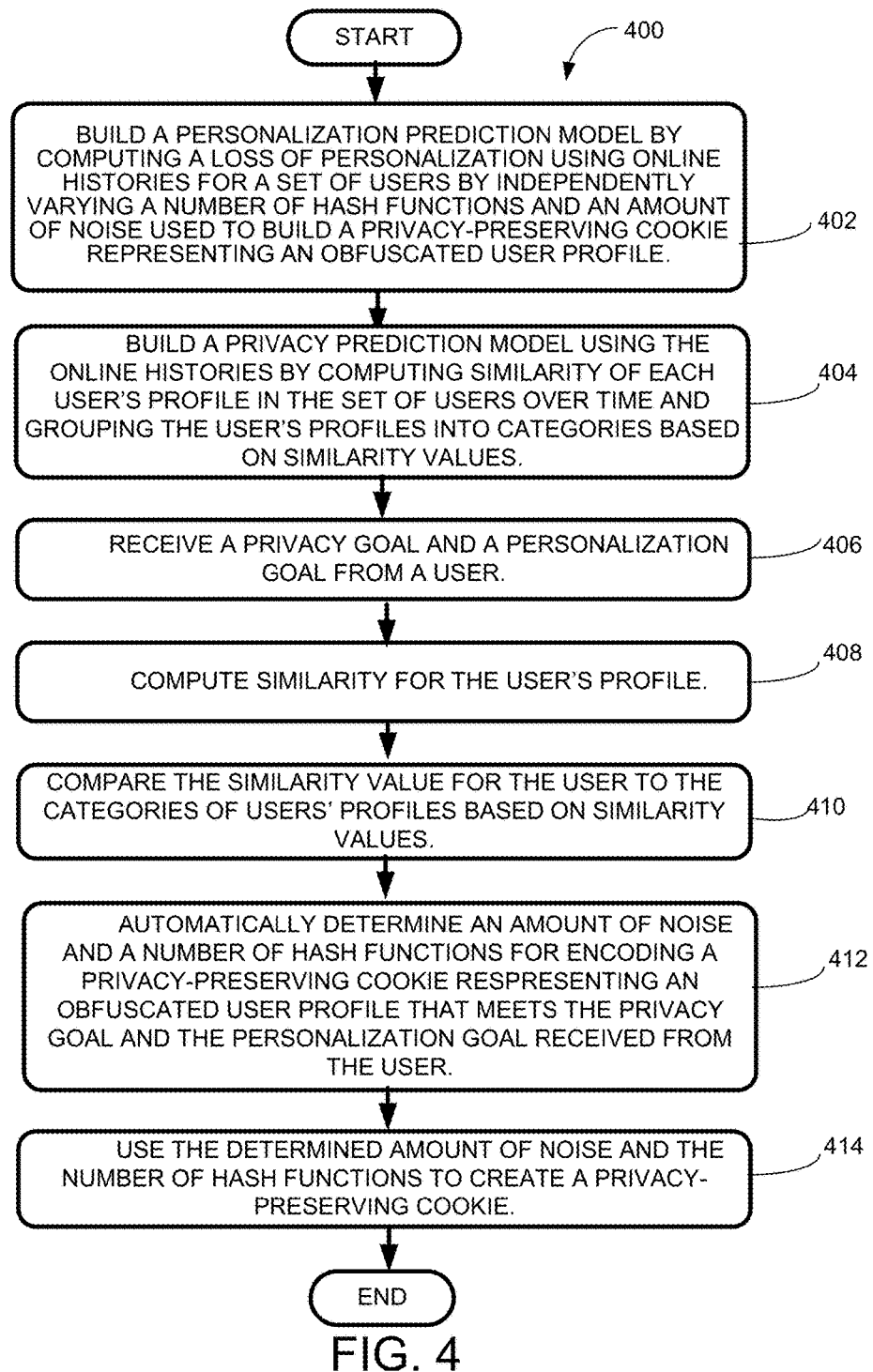
FIG. 4 depicts a flow diagram of yet another exemplary process for practicing another implementation of the privacy-preserving cookie generator which automatically configures a privacy-preserving data structure based on a user's personalization and privacy goals.

FIG. 4 shows yet another exemplary process that depicts how noise injected into an encoded user profile to create the privacy-preserving cookie is automated to allow for a tradeoff between a level of personalization and a level of privacy. As shown in block 402, a personalization prediction model is built by computing a loss of personalization using online histories for a set of online users by independently varying a number of hash functions and an amount of noise used to build a privacy-preserving cookie representing an obfuscated user profile. A privacy prediction model is also built using the histories of users of the online services by computing the similarity of each user's profile in the set of users over time and grouping the users' profiles into categories based on similarity values, as shown in block 404. A privacy goal and a personalization goal are received from a user (block 406) and a similarity value is computed for the user's profile (as shown in block 408). The similarity value for the user's profile is compared to the categories of users' profiles based on similarity values, as shown in block 410, and an amount of noise and a number of hash functions for encoding a privacy-preserving cookie representing an obfuscated user profile that meets the privacy goal and the personalization goal received from the user are automatically determined, as shown in block 412. These parameters can then be used to build a privacy-preserving cookie (block 414). Details of the computations of this implementation are shown in the next paragraphs.

As discussed above with respect to FIG. 4, by varying the noise level, a user can control the privacy-personalization tradeoff in obtaining online services. A privacy-concerned user may choose to operate at the highest noise levels, while a user that values privacy and personalization in the same manner may decide to operate at moderate noise levels. The procedure 400 shown in FIG. 4 automatically configures the noise parameters in a privacy-preserving cookie given a user's privacy and personalization goals. The procedure takes as input a personalization goal specified as maximum percentage personalization loss that a user is willing to tolerate (compared to the personalization obtained with exact profiles), and a privacy goal specified as the minimum unlinkability a user wants to achieve. In addition, the procedure uses the history of profiles previously sent by the client to the server to compute the profile similarity over time. The procedure returns the pair $<k,l>$ for configuring the privacy-preserving cookie. The privacy-preserving cookie procedure employs two prediction models, one for personalization and one for privacy. The models are trained using a set of users for which search history is available.

The privacy-preserving cookie generator builds the personalization model by computing the loss in personalization for the training users when independently varying the parameters k and l (m=2000 in one working implementation). Given a target personalization loss, the model predicts various $<k,l>$ combinations by performing a linear interpolation between all measured data points.

To build the privacy model, the privacy-preserving cookie generator leverages the observation that the similarity of a user's profiles over time makes him more trackable. Hence, the greater the similarity, the more noise required to achieve a certain level of unlinkability. The goal of the privacy model is then to represent the relationship between similarity, unlinkability and $<k,l>$. In one working implementation, the privacy-preserving cookie generator computes the Jaccard similarity between two consecutive time-period long (e.g., two week long) profiles of the training users and then divides them into a number of buckets (e.g., s=10 buckets) based on the similarity value. For each bucket, the privacy-preserving cookie generator then creates a privacy model by doing a linear interpolation in a similar way as for the personalization model. For a desired level of unlinkability the model predicts the pair $<k,l>$. Thus, given a privacy goal and the similarity of a user's profile across time, the procedure finds which similarity bucket the user belongs to, and then uses the appropriate privacy model for that bucket to predict $<k,l>$.

The privacy model provides a lower bound on the noise (i.e., with more noise higher unlinkability is achieved). The personalization model provides an upper bound (i.e., with more noise a larger personalization loss is experienced). If the lower bound is higher than the upper bound, there is no solution satisfying the goals. Otherwise, the solution is determined by randomly selecting a k among the possible values and use the minimum noise level for such k.

Figure 5:
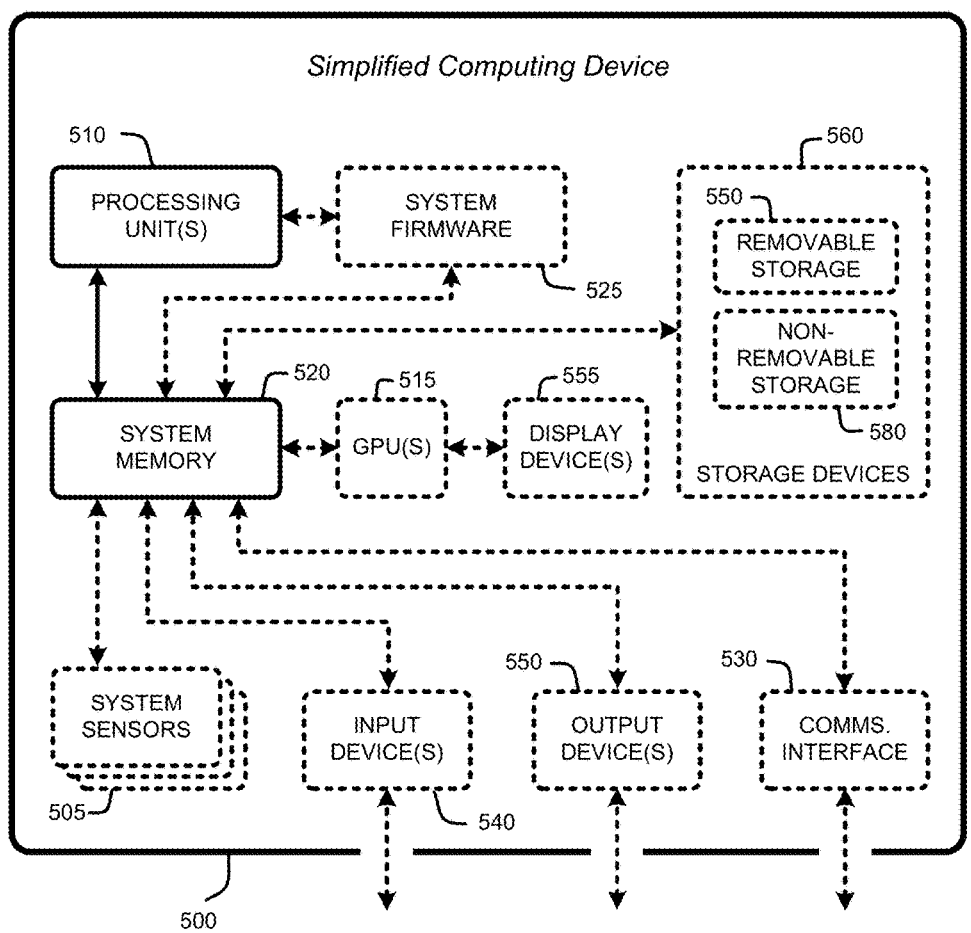
FIG. 5 is a schematic of exemplary computing environments which can be used to practice various implementations of the privacy-preserving cookie generator.

FIG. 5 provides another exemplary process 500 that depicts how a service provider on a server or computing cloud processes a received privacy-preserving data structure or cookie. As shown in block 502, a user's online service request and an obfuscated user profile (e.g. the privacy-preserving cookie created by applying a Bloom filter to an original user profile and setting random bits in the obfuscated user profile). Services in response to the user's online service request are retrieved, as shown in block 504. For example, for a search request the service provider retrieves a set of search results and ranks them. The retrieved results are then re-ranked by the service provider using the obfuscated user profile to provide personalized online services to the user, as shown in block 506. For example, the service provider queries the privacy-preserving cookie for each search result returned in response to the user's online service request and if the search result is contained in the privacy-preserving cookie it is ranked higher. In some implementations, to check whether a certain result is contained in the privacy-preserving cookie, the service provider applies k hash functions to the result, gets k array positions and checks whether the bits at those positions are set to 1. If they are all set, it means that the result is contained in the privacy-preserving cookie. This querying method is based on a standard way to query a Bloom filter.

3.0 Details and Exemplary Computations

The following paragraphs provide details and exemplary computations for various components and implementations of the privacy-preserving cookie generator.

3.1 Search Log Configuration

As discussed above, search logs can be used in determining privacy-personalization tradeoffs and creating an obfuscated user profile. In one implementation of the privacy-preserving cookie generator, each entry in the search logs contains five fields which are used to create a user profile based on the user's on-line activities: a unique user ID (these IDs are typically established using IP addresses, cookies and search tool bars), a search query submitted by the user, timestamp, the top-10 search results shown to the user, and the results that were clicked by the user including the timestamp of each click. Each search result consists of a URL and top-3 (first or second level) ODP categories for the web page at the URL.

3.2 Creating User Profiles

In order to create a privacy-preserving data structure or cookie, user profiles are created for a user's online activity. The state-of-the-art in web search personalization uses two main techniques for building user profiles from search logs: fine-grained URL-based and coarse-grained interest-based profiling. Implementations of the privacy preserving cookie creator can use either of these or other techniques.

As their names suggest, URL-based profiles include URLs that users visit most often, while interest-based profiles include models of users' interests mined from users' past behavior. To build URL-based profiles, for each search session in the user's search log where at least one of the search results was clicked, a satisfied click, a click followed by a period of inactivity, is extracted. Then the corresponding clicked URLs are extracted and the user profile is assembled as a list of URL domains, ordered by recurrence in the search log.

To build interest-based profiles, each query is first labeled in the user's search log with a category. The category of a query can be determined as the most common ODP category of top-10 search results of the query. Higher weights (e.g., by default double weight) can be assigned to the ODP categories of the clicked results for a certain query. The interest profile of the user can then be constructed as a distribution of ODP categories across all queries in the available search history for the user.

3.3 Using User Profiles to Rank Results

Once profiles are built, they can be used for ranking results. Specifically, in an exemplary implementation for search, for a given search query, a score is assigned to each of the top M search results (M=50, for example) returned for the query. If the domain (or any of the ODP categories) of the result are present in the user's URL (or interest) profile, the search result receives a score of $\alpha*M$, where a is a parameter ranging from 0 to 1 that controls the aggressiveness of personalization. The larger $\alpha$, the more aggressive the re-ranking ($\alpha=0.25$ was used in one implementation). If the domain (or the ODP category) is not present, the score is 0. The results are re-ranked based on the score. Since the user's profile is obfuscated in the form of a privacy-preserving data structure/cookie when search results are re-ranked based on the obfuscated user profile, the re-ranking will be able to provide personalized results to some extent while preserving the user's privacy.

3.4 Measuring a Level of Personalization

To evaluate personalization, user clicks recorded in search logs can be leveraged. The key insight of this methodology is that if a personalization procedure is able to rank "relevant" results (i.e., those that were clicked) at the top, the user will be more satisfied with the search. Hence, clicking decisions can be used as a relevance metric to quantify personalization improvements.

The quality of personalization can be measured by average rank, defined as $$\text{Avg\_rank}_i = \frac{1}{|R_i^c|} \sum_{r \in R_i^c} \text{rank}_r \qquad (1)$$

where $R_i^c$ is the set of results clicked for a given query i, and $\text{rank}_r$ is the rank of the result r assigned by the personalization procedure. The smaller the average rank, the higher the personalization quality.

3.5 Unlinkability as a Privacy Measure

As discussed previously, unlinkability can be used as a privacy measure. The formal definition of unlinkability measures the degree of unlinkability of a set of elements as entropy. A partition of the set of elements (meaning a division of the set as a union of non-overlapping and non-empty subsets) represents a possible way to "link" all elements in the set to each other (e.g., given a set of 4 elements, 15 partitions exist). In this context, "linking" means identifying user profiles collected in different contexts (e.g., different time periods) that belong to the same user. The unlinkability of the elements in the set is measured as entropy $$H(X) = -\sum_{x \in X} p(x) \log_2 p(x)$$

where X denotes the set of possible partitions and p(x) is the probability mass function, $0 \leq p(x) \leq 1$, denoting the probability that x is the correct partition.

Without any additional information, a priori, all partitions are equally possible so the probability distribution is uniform and the entropy of the elements is at its maximum ($H_{priori}(X) = -\log_2(1/m)$). However, an adversary with access to some information about the partitions can, a posteriori, rule out some candidate partitions, thus lowering the entropy. A malicious server can observe the content of the user profiles and assign higher probabilities to certain partitions. The degree of unlinkability of the set of elements against an adversary is therefore defined as the ratio between the a posteriori entropy to the a priori entropy:

$$U(X) = \frac{H_{posteriori}(X)}{H_{priori}(X)}$$

Unfortunately, this definition does not scale to a large set, as enumerating all possible partitions is a computationally hard problem. Therefore, some simplifying assumptions can be made. First, it can be assumed that there are a constant number of users in the system over time, and a user whose profile is seen in the time period i (where the time period is a fixed length of time of the order of a few weeks in one implementation of the privacy-preserving cookie generator) will have a profile also in the time period i+1. Second, it can be assumed that historical information about some users that interacted with the system is available (this allows for training of a linkability model that a potential adversary may build). Third, instead of computing all possible partitions to calculate the system unlinkability, "per-user unlinkability" can be computed by comparing a user's profile in time-period i with all the other profiles in time-period i+1, independently of the other users in the system, as described in details as follows.

The process of determining the degree of unlinkability consists of two steps. In the first step, a linkability model is built from the search logs of n users over a period T=T1+T2 (T=1 month). For each of the n users two profiles are created, one from the first time period T1 and one from the next time period T2. Next, to measure profile similarity the Jaccard similarity between the $n^2$ possible pairs of profiles is computed, where the first profile comes from the set of T1 profiles and the second comes from the set of T2 profiles. The Jaccard similarity coefficient (or Jaccard index) measures similarity between finite sample sets, and is defined as the size of the intersection divided by the size of the union of the sample sets. In one case the sample sets are the user profiles. Each user profile is in fact a set of URLs or interests.

Using the ground truth available in the users' logs (i.e., the information of which T1 and T2 profile belong to the same user), a linkability model is trained. This is defined as a function that maps the Jaccard similarity of a pair of profiles into the probability of these two profiles belonging to the same user.

In the second step, the unlinkability of a user's profile is computed by calculating the a priori and a posteriori entropy. Given a set of m users, where each user has two profiles computed over two consecutive (possibly overlapping) time periods P1 and P2, the linkability model is applied to compute the probability of a particular profile from P1 being linked to a profile in P2, (i.e., belonging to the same user). Note that P1 and P2 are different time periods from T1 and T2 above, but of the same length. Without any information about any user, the probability of a particular profile $p_i^{p1}$ being linked to another profile $p_j^{p2}$ is 1/m, hence, the a priori entropy is $\log_2(m)$. If more information about users becomes available (by calculating the similarity between profiles and using the linkability model described above), then the probability that $p_i^{p1}$ is linked to a particular $p_j^{p2}$ changes, and it can be used to compute the a posteriori entropy, smaller than the a priori entropy. The ratio of the a posteriori to the a priori entropy is the unlinkability of user i.

3.2.2 Linkable Users and Max Probability

The unlinkability metric gives an average estimation based on entropy, but it does not capture the full distribution of the a posteriori probability. Entropy-based unlinkability tries to quantify the amount of information that is required to totally break the anonymity of a profile (i.e., identify another profile with the same owner), but in practice successful attacks occur if a subset of the profiles can be linked with a good probability, significantly greater than in the case of the uniform distribution. Others have reported similar problems with entropy-based metrics and have proposed complementing them with additional metrics such as quantiles and maximum probability.

To address this, two additional measures can be used: linkable users percentage and max probability. Linkable users percentage measures the percentage of users which can be correctly linked using the linkability model. The linkability probabilities are computed between the P1 and P2 profiles of the m users to obtain a m*m matrix of probabilities. Using this matrix, each profile from P2 to a profile from P1 are linked, starting with the one with highest probability and eliminating profiles from P1 and P2 as they get linked. Linkable users percentage is defined as the percentage of users whose profiles of two consecutive periods can be linked correctly. Max probability is the maximum linkability probability in the m*m matrix of probabilities after removing the top outliers, typically the top 1% (this is equivalent to computing the 99th percentile).

5.0 Exemplary Operating Environment:

The privacy-preserving cookie generator implementations described herein are operational within numerous types of general purpose or special purpose computing system environments or configurations. FIG. 5 illustrates a simplified example of a general-purpose computer system on which various implementations and elements of the privacy-preserving cookie generator, as described herein, may be implemented. It is noted that any boxes that are represented by broken or dashed lines in the simplified computing device 500 shown in FIG. 5 represent alternate implementations of the simplified computing device. As described below, any or all of these alternate implementations may be used in combination with other alternate implementations that are described throughout this document.

The simplified computing device 500 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the privacy-preserving cookie generator implementations described herein, the device should have a sufficient computational capability and system memory to enable basic computational operations. In particular, the computational capability of the simplified computing device 500 shown in FIG. 5 is generally illustrated by one or more processing unit(s) 510, and may also include one or more graphics processing units (GPUs) 515, either or both in communication with system memory 520. Note that the processing unit(s) 510 of the simplified computing device 500 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 500 may also include other components, such as, for example, a communications interface 530. The simplified computing device 500 may also include one or more conventional computer input devices 540 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 500 and with any other component or feature of the privacy-preserving cookie generator, including input, output, control, feedback, and response to one or more users or other devices or systems associated with the privacy-preserving cookie generator, are enabled by a variety of Natural User Interface (NUI) scenarios. The NUI techniques and scenarios enabled by the privacy-preserving cookie generator include, but are not limited to, interface technologies that allow one or more users user to interact with the privacy-preserving cookie generator in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 540 or system sensors 505. Such NUI implementations are also enabled by the use of various techniques including, but not limited to, information derived from system sensors 505 or other input devices 540 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the privacy-preserving cookie generator.

However, it should be understood that the aforementioned exemplary NUI scenarios may be further augmented by combining the use of artificial constraints or additional signals with any combination of NUI inputs. Such artificial constraints or additional signals may be imposed or generated by input devices 540 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the privacy-preserving cookie generator.

The simplified computing device 500 may also include other optional components such as one or more conventional computer output devices 550 (e.g., display device(s) 555, audio output devices, video output devices, devices for transmitting wired or wireless data transmissions, and the like). Note that typical communications interfaces 530, input devices 540, output devices 550, and storage devices 560 for general-purpose computers are well known to those skilled in the art, and will not be described in detail herein.

The simplified computing device 500 shown in FIG. 5 may also include a variety of computer-readable media. Computer-readable media can be any available media that can be accessed by the computing device 500 via storage devices 560, and include both volatile and nonvolatile media that is either removable 570 and/or non-removable 580, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various privacy-preserving cookie generator implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 525, hardware, or any combination thereof to control a computer to implement the disclosed subject matter. The term "article of manufacture" as used herein is intended to encompass a computer program accessible from any computer-readable device, or media.

The privacy-preserving cookie generator implementations described herein may be further described in the general context of computer-executable instructions, such as program modules, being executed by a computing device. Generally, program modules include routines, programs, objects, components, data structures, and the like, that perform particular tasks or implement particular abstract data types. The privacy-preserving cookie generator implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

The foregoing description of the privacy-preserving cookie generator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the privacy-preserving cookie generator. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

6.0 Other Implementations

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the privacy-preserving cookie generator described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A computer-implemented process for creating a privacy-preserving data structure representing an obfuscated user profile to provide personalization for online services without user tracking, comprising:
    encoding a user profile into a data structure that has naturally occurring noise and that efficiently supports noise addition; and injecting noise into the encoded data structure to create the privacy-preserving data structure representing the obfuscated user profile that allows personalized online services to be provided to a user while maintaining a specified level of user privacy, wherein the noise injected into the encoded data structure is automated to allow for a tradeoff between the specified level of user privacy and a level of personalization, and wherein the noise injected is automated by using a personalization prediction model that computes a loss of personalization using online histories for a set of users and independently varying a number of hash functions and an amount of noise used to build the privacy-preserving structure.

2. The computer-implemented process of claim 1, further comprising:
sending the privacy preserving data structure over a network with a client request; and
receiving service results over the network in response to the request.

3. The computer-implemented process of claim 2, wherein the privacy-preserving data structure is sent over the network with a search query; and wherein the received services are search results.

4. The computer-implemented process of claim 1, wherein the user profile is encoded using a Bloom filter.

5. The computer-implemented process of claim 4, wherein the noise is injected by setting random bits in the encoded data structure and by controlling the probability of false positives naturally occurring in Bloom filters.

6. The computer-implemented process of claim 5, wherein an increased number of random bits that are set in the encoded data structure increases the level of user privacy.

7. The computer-implemented process of claim 5, wherein the number of bits set represents noise and wherein the level of noise is controlled by the fraction of bits set in the Bloom filter.

8. The computer-implemented process of claim 1, wherein the privacy-preserving data structure is created without the use of a noise dictionary.

9. The computer-implemented process of claim 1, wherein the user profile is based on a user's online activities.

10. A system for preserving user privacy while providing personalized online services, comprising:
a computing device;
a computer program, stored on a memory device, comprising program modules executable by the computing device, wherein the computing device is directed by the program modules of the computer program to,
build a personalization profile based on a user's online activities;
encode the personalization profile by applying a Bloom filter to the personalization profile;
inject noise into the encoded personalization profile to create a privacy-preserving cookie, wherein the injection of noise allows for a tradeoff between a specified level privacy and a level of personalization, and wherein the noise is controlled by setting a random number of bits in the encoded personalization profile; and
attach the privacy-preserving cookie to an online service request sent over a network to allow a service provider to provide personalized results in response to the request while maintaining user privacy.

11. The system of claim 10, wherein the injection of noise is automated.

12. The system of claim 10, wherein user privacy is increased by setting a greater number of random bits in the encoded personalization profile.

13. The system of claim 10, wherein communication overhead is reduced by using the privacy-preserving cookie in a search application.

14. The system of claim 10, wherein a level of obfuscation of the personalization profile is configured through the number of hash functions applied to the bits of the personalization profile when encoding the personalization profile by applying the Bloom filter.

15. The system of claim 10, wherein the noise injected into the personalization profile to create the privacy-preserving cookie is automated to allow for a tradeoff between a level of personalization and a level of privacy.

16. The system of claim 15, wherein the automation comprises:
building a personalization prediction model by computing a loss of personalization using online histories for a set of users by independently varying a number of hash functions and an amount of noise used to build the privacy-preserving cookie representing an obfuscated user profile;
building a privacy prediction model using the online histories by computing similarity of each user's profile in the set of users over time and grouping the users' profiles into categories based on similarity values;
receiving a privacy goal and a personalization goal from a user;
computing a similarity value for the user;
comparing the similarity value for the user to the categories of users' profiles based on similarity values; and
automatically determining an amount of noise and a number of hash functions for encoding a privacy-preserving cookie representing an obfuscated user profile that meets the privacy goal and the personalization goal received from the user.

17. The system of claim 16, wherein the similarity value of each user's profile is determined by using a Jaccard similarity function.

18. The system of claim 16, wherein the personalization goal is a maximum acceptable percentage of personalization loss obtained with an obfuscated profile compared to the personalization obtained by using the user's unobfuscated profile.

19. The system of claim 16, wherein the privacy goal is based on minimum unlinkability.

20. A computer-implemented process for providing personalization of online services without user tracking, comprising:
receiving a user's online service request and an obfuscated user profile created by applying a Bloom filter to an original user profile and setting random bits in the obfuscated user profile, wherein the level of obfuscation of the user profile is determined by using a privacy prediction model created by computing for a set of users over time a similarity value of each user's profile and grouping the users' profiles into categories based on similarity values;
retrieving services in response to the user's online service request; and ranking the retrieved results using the obfuscated user profile to provide personalized online services to the user.

* * * * *